April 9, 1946.　　　J. SCHEMINGER, JR　　　2,398,192
BOARD FOR USE IN SLICING THIN SLICES
Filed June 18, 1943　　　3 Sheets-Sheet 1

INVENTOR
JOHN SCHEMINGER Jr.
BY Thomas A. Jenkes
ATTORNEY

April 9, 1946.   J. SCHEMINGER, JR   2,398,192
BOARD FOR USE IN SLICING THIN SLICES
Filed June 18, 1943   3 Sheets-Sheet 2

INVENTOR
JOHN SCHEMENGER Jr
BY Thomas A. Jenckes
ATTORNEY

April 9, 1946.                J. SCHEMINGER, JR                 2,398,192
                      BOARD FOR USE IN SLICING THIN SLICES
                        Filed June 18, 1943          3 Sheets-Sheet 3

INVENTOR
JOHN SCHEMINGER Jr
BY Thomas A. Jenckes
ATTORNEY

Patented Apr. 9, 1946

2,398,192

UNITED STATES PATENT OFFICE 2,398,192

BOARD FOR USE IN SLICING THIN SLICES

John Scheminger, Jr., Providence, R. I.

Application June 18, 1943, Serial No. 491,336

8 Claims. (Cl. 146—150)

My invention relates to a board for use in slicing thin even slices from a loaf of bread or other soft food article.

While I am aware that others have provided boards for use in slicing bread or cake, comprising a base and slotted knife guides projecting upwardly from each side of the base, so far as I am aware no one has hitherto provided a device of this description in which the knife guides may be pivoted inwardly one on top of the other for storage and which are so constructed and so pivotally mounted as to resist outward pressure.

A further feature of my invention comprises the fact that I may omit one of said knife guides and still have a device which will function in a satisfactory manner.

A main object of my invention, however, is to provide a device capable of cutting very thin even slices from a food article and preferably thin slices of various thicknesses. Very often in use it is desirable to use thin articles of food, such as a very thin slice of bread capable of making melba toast or a thin slice of meat, meat loaf or other food for making sandwiches for home or restaurant use. While I am aware that others have provided gauges comprising short bars for abutting one portion only of the food article to gauge the thickness of the cut slice, I have found as a practical matter, unless the flat cut end of the food article abuts a flat surface as large as itself and the food article be pressed against it, that it is impossible to cut thin even slices from a soft food article, such as a loaf of bread or other food article of the type hitherto described. For this purpose I provide a flat end rest of substantially the area of the flat end of the food article so that the entire food article may be pressed against the entire end rest prior to slicing it into thin slices.

A further feature of my invention resides in the fact that the end rest may be interposable in a plurality of selected positions on said base to vary the thickness of the cut slices.

These and such other objects of my invention as may hereinafter appear will be best understood from a description of the accompanying drawings, which illustrate various embodiments of my invention.

Figure 1:
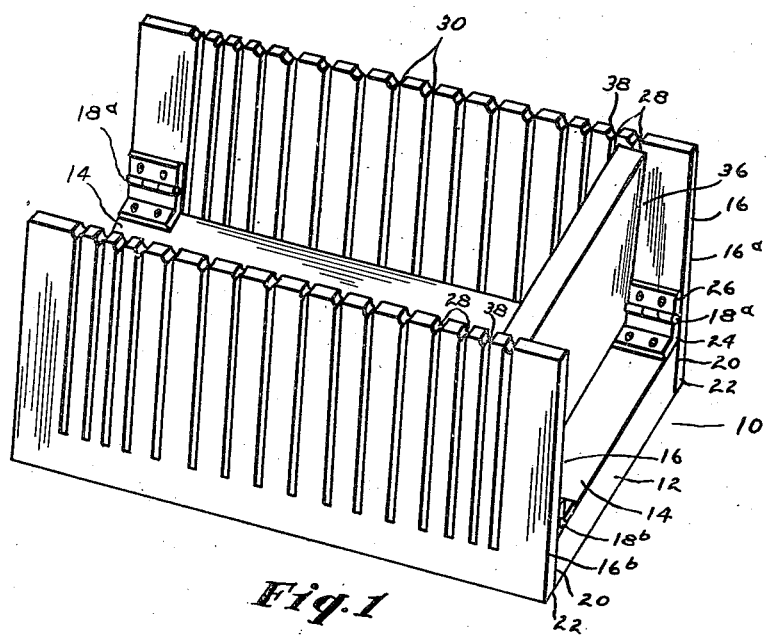
Fig. 1 is a perspective view of a slicing board having two knife guides and also employing an end rest, constructed in accordance with my invention.
Figure 2:
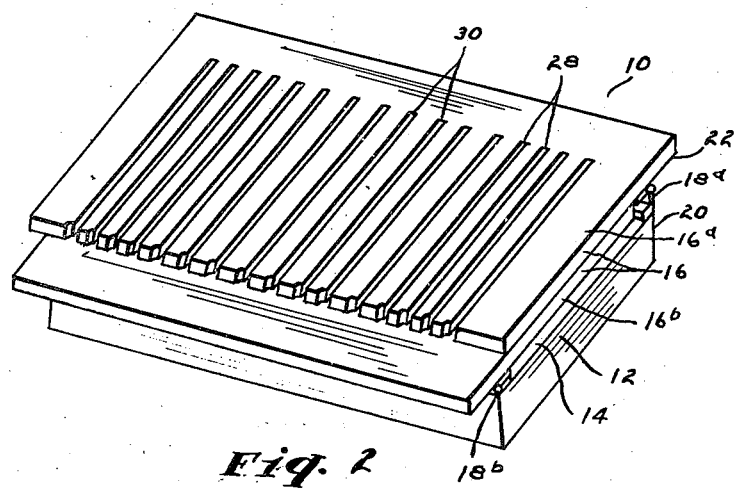
Fig. 2 is a perspective view of the embodiment of my invention shown in Fig. 1 with the end rest removed and the knife guides pivoted one on top of each other for storage.

In the drawings, wherein like characters of reference generally indicate like parts throughout, 10 generally indicates a slicing board for use in slicing thin even slices from a loaf of bread or other soft food article, constructed in accordance with my invention. Said slicing board comprises a flat base 12 having a flat upper surface 14 for receiving a loaf of bread or other soft food article thereon, one or more knife guides 16 projecting upwardly, one from each side of the base 12, one knife guide 16, as in the embodiment shown in Figs. 3 and 4 and two knife guides 16a and 16b one from each side as in the embodiment shown in Figs. 1, 2, 5 and 6. In order that the housewife may be able to disassemble my improved device into a compact position for storage, as shown in Figs. 2 and 4, each of one or more knife guides 16 is pivotally mounted as at 18 on one side 20 of said base. In the embodiment shown in Figs. 1, 2, 5 and 6 each knife guide 16a or 16b is pivotally mounted on a hinge 18 adjacent the upper edge of the base so that the knife guide 16 may pivot inwardly over the top of the base for storage and so that the lower end 22 of the knife guide may abut the side wall 20 of the base to stand in a substantially vertical position resisting outward pressure. For this purpose, in the embodiments shown, I preferably provide a hinge 18 at each end of the base having a leaf 24 adapted to be pivotally attached to the top of the base near the side thereof and a leaf 26 adapted to be pivotally attached to the knife guide above the level of the top of the base so as to permit the lower end 22 of the knife guide to abut the side wall 20 of the base as the knife guide 16 is pivoted to the open position shown in Fig. 1. Any other suitable type of means for so pivotally mounting the knife guides on each side of said base may be employed.

Figures 6, 7:
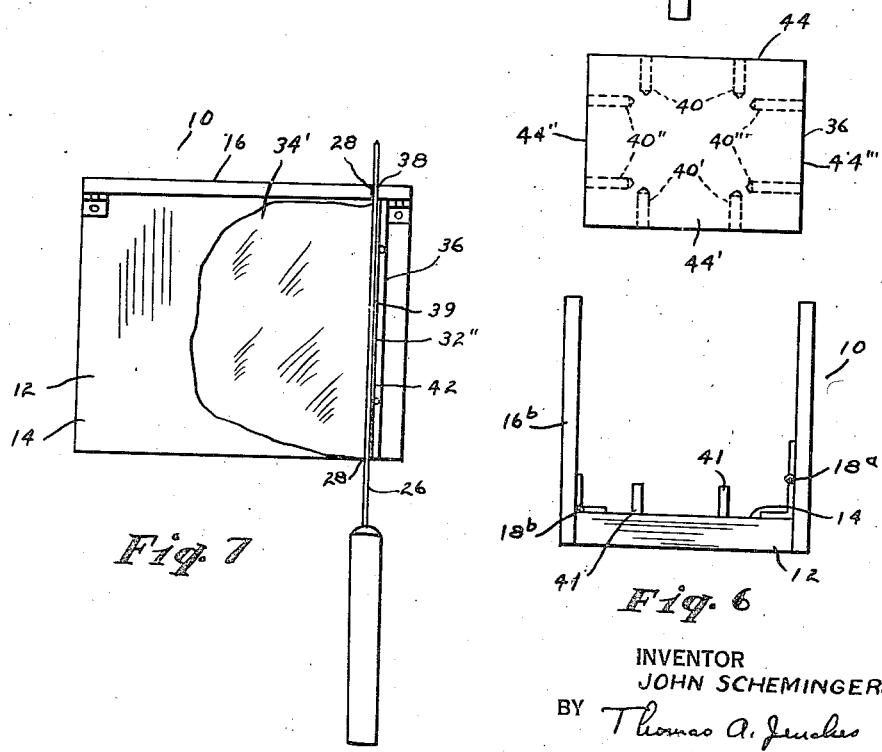
Fig. 6 is an end elevation of the embodiment of my invention shown in Fig. 1 showing the end rest removed vertically above the slicing board and particularly illustrating the means I preferably employ for mounting the end rest on the slicing board at variably spaced distances from its adjacent set of slots.
Fig. 7 is a plan view of a modified form of the invention shown in Figs. 3 and 4, employing a single slot in a single knife guide and my improved end rest to cut thin slices from the food article shown therein.

I have found in practice that the device functions in a slightly superior manner if a knife guide 16a and a knife guide 16b is provided for each side of said base and I thus provide suitable hinges 18a and 18b or other suitable means for pivotally mounting each knife guide in the manner hitherto described on the base. Where two knife guides 16a and 16b are provided, however, the hinge 18b for one set of knife guides is mounted immediately adjacent the upper surface of the base adjacent one side thereof and the hinge 18a for the other knife guide 16a is mounted at a spaced distance above said base adjacent the opposite side thereof, substantially the thickness of the opposite knife guide 16b as shown in Fig. 6. It is thus obvious that in use, as shown in Fig. 2, when two knife guides are employed that one knife guide 16b may pivot inwardly on top of the base as shown in Fig. 2 and the other knife guide 16a may pivot inwardly over said knife guide 16b as shown in Fig. 2.

Figure 3:
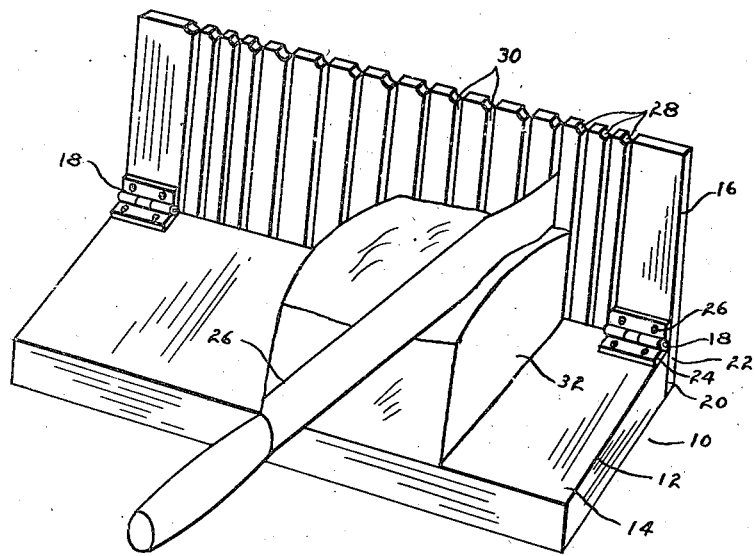
Fig. 3 is a perspective view of a slicing board constructed in accordance with my invention employing a single knife guide and showing a slice of cake being cut therein.
Figure 4:
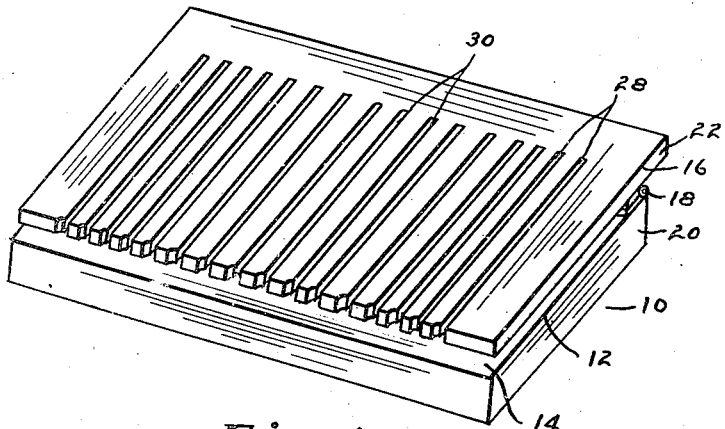
Fig. 4 is a perspective view of the embodiment of my invention shown in Fig. 3 with the knife guide pivoted to a closed position for storage.

As stated hitherto, my device may be employed for cutting a plurality of slices of bread, cake or other soft food article with a single knife 26 in successive cutting operations as in the embodiments shown in Figs. 1–6, but it also may be employed as in the embodiment shown in Fig. 7 to cut a single slice with a knife 26 in a single cutting operation. If it be desired to cut a plurality of slices one immediately after the other the knife guide 16 or each set of knife guides 16a and 16b may be provided with guide slots 28 or a plurality of sets of guide slots 28 preferably variably spaced at intervals from each other on each knife guide. If two knife guides be employed, the slots therein are preferably variably spaced from each other and are aligned with respective guide slots in the opposite knife guide. Thus, for instance the slots 30 centrally of the knife guide 16 in the embodiment shown in Figs. 3 and 4 may be spaced apart the thickness of a slice of bread, approximately ⅝ of an inch. Also, if desired, as shown in Figs. 3 and 4, the end slots may be more closely spaced together to provide for thinner slices, such as a slice 32 of cake normally thinner than a slice of bread, approximately ⅜ of an inch.

Figure 5:
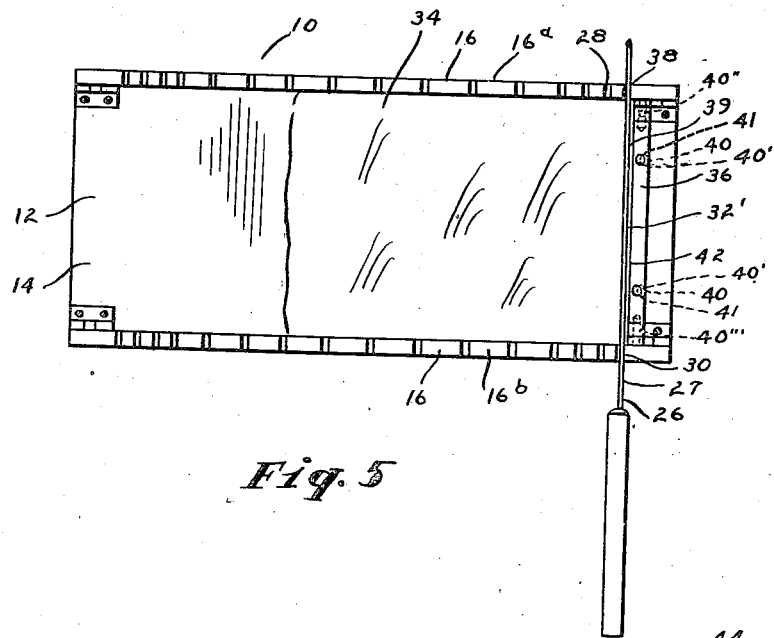
Fig. 5 is a plan view of the embodiment of my invention shown in Fig. 1 with the end rest mounted at such a variably spaced distance from the adjacent set of slots in the knife guides as to cut a thin slice of bread for use in making melba toast in the manner shown therein.

As stated hitherto, my invention is particularly adapted for cutting very thin even slices from a loaf of bread or other soft food article, such as thin slices 32' as shown in Fig. 5 from a loaf of bread 34 shown therein for making melba toast or a thin slice of meat 32'' from the meat loaf 34' shown in Fig. 7. For this purpose I provide a flat end rest 36 of substantially, where two knife guides 16a and 16b are employed, the area of the space between said knife guides 16a and 16b and base 12 preferably interposable in a plurality of selected positions on said base to selectively vary the distance between one set 38 of adjacent guide slots and said end rest 36 so that the article of food 34 may be pushed against said end rest 36 so as to have the flat end 39 thereof, preferably previously cut, abut said end rest 36 so that the knife blade 27 inserted into said guide slots 38 may cut thin even slices of the size and thickness of the space between said base 12, knife guides 16a and 16b, end rest 36 and said one set of guide slots 38. If a single knife guide 16 only be employed, it is obvious that the end rest 36, as shown in Fig. 7, should be at least substantially the height of said knife guide 16 above said base and the width of said base 12.

If desired, each one or more knife guides 16 may be rigidly mounted on each side of the base 12 and, if desired, the end rest 36 may be permanently mounted in a fixed position relative to said knife guide away from the slot 38 so as to repeatedly cut a plurality of slices 32' of equal thickness from said food article 34'. Quite often in use, however, it is desirable to be able to selectively mount the end rest 36 on said base at variably spaced distances from a single guide slot 38 or single set 38 of guide slots 28 to selectively successively cut slices of different thicknesses. Any suitable means may be provided to adjustably mount said end rest at suitable variably spaced distances from a single guide slot 38 or set 38 of guide slots 28.

I have shown in the drawings a detachable end rest 36 provided with suitable means for mounting it at selectively spaced distances from a single guide slot 38 or set 38 of guide slots 28. For this purpose I may provide one or more pegs 41 projecting upwardly from said base at a suitable distance from said guide slot 38 or set 38 of guide slots 28 and I may, as shown in Fig. 6, provide said end rest 36 with a plurality of cooperating holes 40, 40', 40'' and 40''' in each edge thereof at a selectively spaced distance from the inner edge 42 of said end rest. Thus in the embodiment shown, the holes 40 in one edge 44 may be closely spaced from said inner edge 42, the slots 40' in the opposite edge 44' may be spaced at a slightly greater distance from said inner edge 42, the slots 40'' in the third edge 42'' may be spaced at a slightly greater distance from said inner edge 42 and the slots 40''' in the fourth edge 42''' may be spaced at a further slightly greater distance from the inner edge 42 of said end rest 36. It is thus obvious that said end rest may be detachably secured to said base so that said pegs 41 may fit into any of the holes 40, 40', 40'' or 40''' in their respective edges 44, 44', 44'', or 44''', to vary the amount the inner edge 42 of the flat end rest is spaced from the slot 38 or set 38 of slots 28. It is obvious that with this variable spacing selected thicknesses of food slices may be cut on my improved slicing board. It is apparent, however, that any other suitable means may be provided to mount the end rest on said board at variably spaced intervals from said slot 38 or set 38 of guide slots 28.

In use, the end rest 36 is mounted or detachably interposed at a desired spaced distance from its respective slot 38 or set 38 of slots 28 and the knife blade 27 of the knife 26 is inserted through said slot 38 or set 38 of guide slots 28 immediately adjacent the inner edge 42 of said end rest 36 so as to cut a slice 32' or 32'' of the desired thickness from said soft food article 34 or 34'. When cutting such thin slices it is obvious that only one slice may be cut at one time. As stated previously, however, where a plurality of slots or sets of slots are employed, a plurality of relatively thick slices may be cut one right after the other.

It is apparent, therefore, that I have provided a novel type of slicing board with the advantages explained above.

It is understood that my invention is not limited to the specific embodiments shown and that various deviations thereof may be made without departing from the spirit and scope of the appended claims.

What I claim is:

1. A board for use in slicing thin even slices from a loaf of bread or other soft food article, comprising a flat base, knife guides each having its inner edge pivotally mounted on an opposite side of said base to pivot inwardly one on top of the other for storage and having lower ends adapted to abut the side walls of said base to stand in a substantially vertical position resisting outward pressure and having guide slots therein and aligned with guide slots in the opposite knife guide and a flat end rest of substantially the cross-sectional area of the space between said knife guides and base, rigidly settable in a plurality of selected positions on said base to support said knife guide and to selectively vary the distance between one set of guide slots and said end rest, for abutment of the flat end of the food article thereagainst so that a knife inserted in said set of guide slots may cut thin even slices of the size and thickness of the space between said base, knife guides, end rest and said one set of guide slots.

2. A board for use in slicing thin even slices from a loaf of bread or other soft food article, comprising a flat base, knife guides each having its inner edge pivotally mounted on an opposite side of said base to pivot inwardly one on top of the other for storage, having a guide slot therein aligned with a guide slot in the opposite knife guide and a flat end rest of substantially the cross-sectional area of the space between said knife guides and base, rigidly settable in a plurality of selected positions on said base to support said knife guide and to selectively vary the distance between said set of guide slots and said end rest, for abutment of the flat end of the food article thereagainst so that a knife inserted in said set of guide slots may cut thin even slices of the size and thickness of the space between said base, knife guides, end rest and said one set of guide slots.

3. A board for use in slicing thin even slices from a loaf of bread or other soft food article, comprising a flat base, knife guides each having its inner edge pivotally mounted on an opposite side of said base to pivot inwardly one on top of the other for storage, having a guide slot therein aligned with a guide slot in the opposite knife guide and a flat end rest of substantially the cross-sectional area of the space between said knife guides and base, rigidly settable in a selected position on said base at a closely spaced distance from said set of guide slots, for abutment of the flat end of the food article thereagainst so that a knife inserted in said set of guide slots may cut thin even slices of the size and thickness of the space between said base, knife guides, end rest and said one set of guide slots.

4. A board for use in slicing even slices from a loaf of bread or other soft food article, comprising a flat base, knife guides each having its inner edge pivotally mounted on an opposite side of said base to pivot inwardly one on top of the other for storage and having lower ends adapted to abut the side walls of said base to stand in a substantially vertical position resisting outward pressure and having guide slots therein aligned with guide slots in the opposite knife guide.

5. A board for use in slicing thin even slices from a loaf of bread or other soft food article, comprising a flat base, a knife guide having its inner edge pivotally mounted on one side of said base to pivot inwardly on top of said base for storage and having a lower end adapted to abut a side wall of said base to stand in a vertical position resisting outward pressure and having a guide slot therein and a flat end rest of substantially the height of said knife guide above said base and the width of said base, rigidly settable in a plurality of selected positions on said base to support said knife guide and to selectively vary the distance between a guide slot and said end rest for abutment of the flat end of the food article thereagainst so that a knife inserted in said guide slot may cut thin and even slices of the size and thickness of the space between said base, knife guide, end rest and guide slot.

6. A board for use in slicing thin even slices from a loaf of bread or other soft food article, comprising a flat base, a knife guide having its inner edge pivotally mounted on one side of said base to pivot over said base for storage, having a guide slot therein and a flat end rest of substantially the height of said knife guide above said base and the width of said base, rigidly settable in a plurality of selected positions on said base to support said knife guide and to selectively vary the distance between said guide slot and said end rest for abutment of the flat end of the food article thereagainst so that a knife inserted in said guide slot may cut thin and even slices of the size and thickness of the space between said base, knife guide, end rest and guide slot.

7. A board for use in slicing thin even slices from a loaf of bread or other soft food article, comprising a flat base, a knife guide having its inner edge pivotally mounted on one side of said base to pivot over said base for storage, having a guide slot therein and a flat end rest of substantially the height of said knife guide above said base and the width of said base, rigidly settable in a selected position on said base at a closely spaced distance from said guide slot for abutment of the flat end of the food article thereagainst so that a knife inserted in said guide slot may cut thin and even slices of the size and thickness of the space between said base, knife guide, end rest and guide slot.

8. A board for use in slicing thin even slices from a loaf of bread or other soft food article, comprising a flat base, a knife guide having its inner edge pivotally mounted on one side of said base to pivot inwardly on top of said base for storage and having a lower end adapted to abut a side wall of said base to stand in a vertical position resisting outward pressure and having guide slots therein.

JOHN SCHEMINGER, Jr.